United States Patent [19]

Chu et al.

[11] Patent Number: 5,182,168
[45] Date of Patent: Jan. 26, 1993

[54] BIAXIALLY ORIENTED POLYPROPYLENE FILM

[75] Inventors: Shaw-Chang Chu, Cranbury, N.J.; Kevin A. Kirk, Macedon, N.Y.

[73] Assignee: Mobil Oil Corporation, Fairfax, Va.

[21] Appl. No.: 772,646

[22] Filed: Oct. 9, 1991

Related U.S. Application Data

[63] Continuation of Ser. No. 451,906, Dec. 18, 1989, abandoned.

[51] Int. Cl.$^5$ .................. B32B 5/16; B32B 27/08; D02J 1/22
[52] U.S. Cl. ................. 428/330; 428/461; 428/513; 428/516; 428/910; 427/173; 427/322; 427/533; 264/134; 264/241; 264/289.3
[58] Field of Search ............. 428/330, 573, 516, 461, 428/910

[56] References Cited

U.S. PATENT DOCUMENTS

| | | |
|---|---|---|
| 3,176,021 | 3/1965 | Volungis et al. .......... 524/231 |
| 3,326,837 | 6/1967 | Brown et al. .......... 260/30.8 |
| 3,753,769 | 8/1973 | Steiner .......... 428/331 |
| 4,225,644 | 9/1980 | Tsuchiya et al. .......... 428/215 |
| 4,247,496 | 1/1981 | Kawakami .......... 264/22 |
| 4,302,506 | 11/1981 | Heberger .......... 428/341 |
| 4,419,410 | 12/1983 | Weiner .......... 428/516 |
| 4,419,411 | 6/1983 | Park .......... 428/516 |
| 4,436,788 | 3/1984 | Cooper .......... 428/483 |
| 4,486,483 | 12/1984 | Caines .......... 428/195 |
| 4,486,483 | 6/1984 | Caines .......... 428/195 |
| 4,533,509 | 8/1985 | Gust et al. .......... 264/171 |
| 4,578,316 | 3/1986 | Clauson et al. .......... 428/516 |
| 4,618,527 | 10/1986 | Doyen .......... 428/213 |

OTHER PUBLICATIONS

Database WPI, Derwent Publications, London, GB AN=80-19118C(11) Abstract & Jp-55.014223 (Sumitomo Chemical KK).

*Primary Examiner*—P. C. Sluby
*Attorney, Agent, or Firm*—Alexander J. McKillop; Malcolm D. Keen; Marina V. Schneller

[57] ABSTRACT

A thermoplastic film comprising a base layer of a thermoplastic resin which comprises polypropylene and a coating layer of an alkali metal salt of an alkyl sulfate is disclosed. The film is characterized by reduced COF and improved anti-blocking characteristics without the attendant problems associated with decreased clarity, adhesion and wettability common to films treated to improve their COF and anti-blocking characteristics. The disclosure also provides a process for making the film in which the polypropylene-coating thermoplastic resin is extruded into a sheet, said sheet oriented in the longitudinal direction to form a monoxially oriented film, said film coated with the alkali metal salt of an alkyl sulfate and said coated film oriented in the transverse direction.

22 Claims, No Drawings

BIAXIALLY ORIENTED POLYPROPYLENE FILM

This is a continuation of copending application Ser. No. 07/451,906, filed on Dec. 18, 1989, now abandoned.

BACKGROUND OF THE INVENTION

1. Field of the Invention

Polypropylene films have found wide acceptance in the packaging industry, especially as a food packaging agent, because of their superior physical properties. Polypropylene film, usually biaxially oriented, is characterized by high tensile modulus and stiffness, excellent optical clarity and good moisture resistance. However, polypropylene film possesses one major disadvantageous property, high inherent coefficient of friction (COF).

High COF complicates the processing of polypropylene film. Polypropylene film processing is impeded by poor transport, caused by its high COF, over rollers, guides and the like. In addition, high COF creates film storage problems. Because of its high COF one layer of polypropylene film sticks to those above and beneath it, creating the problem commonly referred to as blocking.

This serious disadvantage of polypropylene film is well known to those skilled in the art. Thus, many proposed solutions to overcome this major deficiency have been proposed in the art. One such proposal has been to incorporate additives in the polypropylene resin processed to form the film. A favorite additive suggested in the art is fatty acid amides. These amides decrease the film's COF.

Although this method has been used, actual COF is a function of the heat history to which the film has been exposed during shipping, storage and processing. As such, it is subject to wide variation. More significantly, the presence of fatty acid amides on the film surface oftentimes adversely affects the appearance of the film as manifested by decreased gloss and the presence of streaks. Another serious disadvantage of using fatty acid amides is the effect of fatty acid amides on polypropylene film surface wettability and adhesion. This adverse characteristic applies to coatings, inks, adhesives and the like whether organic or water based.

Of even greater concern in the use of fatty acid amides to overcome the problem of high COF resides in the manufacture of the polypropylene film which contains the amide. Fatty acid amides must be applied as an organic solution, utilizing an organic solvent. Health and safety factors thus complicate in-plant utilization of this class of slip additive.

Because of these problems other slip additives have been suggested to overcome the inherent problem of high COF in polypropylene films. One such solution is the use of a latex coating containing stearamidopropyl-dimethyl-betahydroxyethylammonium nitrate and a crosslinkable acrylic copolymer. This coating has been advanced for use on polyester films.

Although this coating is alleged to improve slip properties without adversely affecting clarity in polyester films it is unnecessary to determine whether this coating would provide the same improved result on polypropylene film. It is known that such a coating is not in conformity with the requirements and regulations of the U.S. Food and Drug Administration for use in films which contact foods. As such a critical market for polypropylene films, as a food packaging agent, could not be exploited if such a material was added to polypropylene-containing film.

Yet another suggestion advanced in the prior art to reduce the blocking characteristic of polypropylene film is to add a finely divided inorganic material as a thin surface layer. Such a coating not only provides a non-blocking surface having improved slip characteristics but is also independent of the heat history of the film. Moreover, the addition of a surface layer of an inorganic material does not create the adverse optical and wettability effects associated with amide-modified films.

However, like the other proposed solutions, this proposed means of alleviating high COF creates new problems. Oftentimes, polypropylene film is laminated to other films. For example, glassine paper is commonly laminated to polypropylene film. Such a laminate, when provided as a thin surface layer containing finely divided inorganic material, exhibits significantly higher COF values than does the unlaminated polypropylene film. Such laminates are known to perform poorly on conventional form, fill and seal machines.

The above discussion establishes the need in the art for a new and improved polypropylene film characterized by improved anti-blocking characteristics and decreased COF. However, it is incumbent that the improvement in the film's slip property not correspond to the decline in other properties, typical of the solutions advanced in the prior art.

2. Background of the Prior Art

There are several teachings in the prior art relating to thermoplastic films in general and polypropylene films in particular which are fabricated, treated or modified to lower film coefficient of friction. In addition, there are disclosures directed to compositions which may be utilized as film coatings to lower film COF.

One of the earliest relevant references is U.S. Pat. No. 3,176,021. This patent describes a process for preparing a polypropylene film having decreased static COF. In this process crystalline polypropylene is admixed with polyethylene and an amide of a water insoluble carboxylic acid. The composition is melt extruded and processed into a polypropylene film having improved slip properties.

U.S. Pat. No. 3,753,769 is directed to an acrylic based polymer composition for use in coating polyolefin films. The coating composition comprises an interpolymer of an alpha,beta-monoethylenically unsaturated carboxylic acid, an alkylacrylic ester and an alkylmethacrylic ester.

A composite film is set forth in U.S. Pat. No. 4,225,644. The film includes a substrate layer of biaxially oriented polypropylene. The laminate composite film further incorporates a middle layer of a uniaxially or biaxially oriented film of an ethylene-butene copolymer. The outer layer of this composite film, which provides decreased COF, is a uniaxially or biaxially oriented thin film of a primary higher fatty acid amide or an N-substituted higher fatty acid amide.

The teaching of U.S. Pat. No. 4,302,506 is concerned with a biaxially oriented polyester film. The film is coated on one or both sides with a stearamidopropyl-dimethyl-betahydroxyethylammonium nitrate and a crosslinkable methylmethacrylate-ethylacrylate-methacrylamide terpolymer. This coating is recited to produce improved slip properties.

A common teaching in U.S. Pat. No. 4,419,410 and 4,419,411 is to a polypropylene film laminate of a base layer and a skin layer. The base layer of the '410 patent is a comparative high stereoregular polypropylene film containing a surface modifying agent which may be an anti-blocking agent. In the '411 patent the base film is a comparatively high stereoregular polypropylene film which specifically includes an amide or a monocarboxylic acid anti-blocking agent. The skin layer of the '410 patent is again a polypropylene film. The polypropylene of the skin layer is of comparatively low stereoregularity, containing the same surface modifying agents provided in the base film. However, the surface modifying agent of the skin layer is bloomed on its surface in greater concentration than is the surface modifying agent bloomed onto the surface of the base layer. The skin layer of the '411 patent is a polypropylene film also of comparative low stereoregularity which includes finely divided silica and silicone oil. In addition, the skin layer of the '411 patent includes the same amide of a monocarboxylic acid contained in the base film layer.

U.S. Pat. No. 4,486,483 describes an oriented polyester film having a primer coating on at least one side thereof. The coating, said to improve the adhesion of printing inks to polyester film, comprises a water soluble alkali metal salt of an unsaturated fatty acid having from 10 to 18 carbon atoms, an alkyl sulfate having from 8 to 18 carbon atoms or mixtures thereof.

Although a coating of an alkali metal salt of an alkyl sulfate is taught in this disclosure, it is advanced for use only with polyester films to improve ink adhesion. No suggestion is made in this patent that such a coating would improve the slip properties of a polypropylene film which does not include polyester resin.

The disclosure in U.S. Pat. No. 4,533,509 is related to a method of preparing a thermoplastic film free of organic COF reducing agents. In this method a skin layer of an optically clear thermoplastic resin containing inorganic particles is sequentially or simultaneously bonded to a composite thin surface layer of the same thermoplastic resin free of inorganic blocking agents.

U.S. Pat. No. 4,578,316 teaches an oriented film of a blend of polypropylene and polyethylene. The polyethylene constituent of the mixture may be high density polyethylene, medium density polyethylene or a mixture of the two. The film is recited to provide improved COF properties.

A laminate film structure is the subject of U.S. Pat. No. 4,618,527. The laminate film structure of the '527 patent contains a thin film of a thermoplastic resin containing a finely divided inorganic material. The laminate also includes a comparatively thick base layer of a thermoplastic film containing a fatty acid amide.

BRIEF SUMMARY OF THE INVENTION

The present invention provides a polypropylene film having reduced COF and good non-blocking characteristics compared to unmodified polypropylene films. This film is furthermore characterized by a coefficient of friction independent of its previous heat history. Surprisingly, the polypropylene film of this invention, although treated to reduce COF and improve slip characteristics, is free of optical flaws common to reduced COF films. The polypropylene film of the present invention is not adversely affected by diminished wettability and adhesion of inks, coatings and adhesives, whether water or solvent based. Finally, the subject polypropylene film of this invention maintains its decreased COF characteristics even when laminated to other films such as glassine papers.

In accordance with the present invention, a biaxially oriented polypropylene film is provided. The film includes a base layer of a thermoplastic resin which includes polypropylene and a coating of an alkali metal salt of an alkyl sulfate.

In further accordance with the present invention a process for preparing a thermoplastic film is taught. In this process a thermoplastic resin which includes polypropylene is extruded into a sheet. The film is oriented in the longitudinal direction. Thereupon, an alkali metal salt of an alkyl sulfate is coated onto said longitudinally oriented film. The coated film is then oriented in the transverse direction to form the final biaxially oriented film structure.

DETAILED DESCRIPTION

The thermoplastic film of this invention comprises a base layer of a thermoplastic resin, which comprises polypropylene, upon which is disposed a coating layer of an alkali metal salt of an alkyl sulfate. The base layer, a relatively thick layer of the thermoplastic resin, is, as stated above, a resin which comprises polypropylene. That is, the base layer may be a polypropylene homopolymer, a blend of a polypropylene homopolymer and another olefinic polymer, a co-extrusion of a polypropylene homopolymer and an olefinic polymer and the like. More preferably, the base thermoplastic film comprises a polypropylene homopolymer or a co-extrusion of a polypropylene homopolymer and an olefinic polymer. Still more preferably, the base thermoplastic film comprises a polypropylene homopolymer or a co-extrusion of a polypropylene homopolymer and an ethylene—propylene copolymer. Most preferably, the base thermoplastic film layer comprises a polypropylene homopolymer.

The above definition of thermoplastic resins within the contemplation of the polypropylene-containing thermoplastic film of this invention excludes thermoplastics other than olefinic polymers. Thus, such commercially important films as the thermoplastic polyesters, i.e., polyethylene terephthalate, are not included in the film of the present invention.

The second layer of the polypropylene film, the coating layer, is a layer of an alkali metal salt of an alkyl sulfate. Preferably, the coating is a potassium or sodium salt of an alkyl sulfate. More preferably, the alkali metal salt of the alkyl sulfate is the sodium salt. It is preferred that the alkyl of the alkyl sulfate contain between about 4 to about 24 carbon atoms. Still more preferably, the number of carbon atoms in the alkyl group of the alkyl sulfate is in the range of between about 6 and about 18. Even more preferably, the alkyl group in the alkyl sulfate salt contains between about 8 and about 16 carbon atoms. Yet even more preferred, the alkyl group contains between about 12 and about 14 carbon atoms. In a particularly preferred embodiment, the alkyl of the alkyl sulfate salt is lauryl. Thus, most preferably, the alkali metal salt of an alkyl sulfate is sodium lauryl sulfate.

In another aspect of the present invention the above-described coated film may be part of a composite film wherein the coated film is laminated onto or supported by another film ply which may be a plastic, paper, such as glassine paper, or metal film. Such a ply is disposed adjacent to the corona treated surface, as described hereinafter. In a particularly preferred embodiment, the composite film of the present invention is a laminate of the coated film of the present invention and a glassine film.

The above discussed coated polypropylene-containing film is formed in a process wherein a polypropylene thermoplastic resin, which comprises the relatively thick polypropylene base layer, is melted and extruded through a slit die. The molten polypropylene-containing thermoplastic is cooled to form a solid sheet which is oriented in the longitudinal direction. An alkali metal salt of an alkyl sulfate is thereupon coated onto the surface of the longitudinally oriented film. The film is thereafter oriented in the transverse direction to form a biaxially oriented coated film.

In a preferred embodiment of this process the molten polypropylene-containing thermoplastic film is initially extruded through a slit die and cast onto a cooling drum wherein it is quenched to form a solid sheet. In a still more preferred embodiment, the quenching of the thermoplastic melt on the cooling drum is followed by reheating of the sheet prior to orienting in the longitudinal direction.

The step of orienting the thermoplastic sheet in the longitudinal direction is, in a preferred embodiment, provided by longitudinal direction stretching. Preferably, stretching in the longitudinal direction involves longitudinal stretching such that the film is increased from about 2.5 times to about 8 times its original length. More preferably, the film is increased from about 3 times to about 7 times its original length.

In a further preferred embodiment of the present invention the longitudinally stretched film, prior to the application of the coating layer, is surface treated to improve surface wettability. Preferably, this surface treatment is provided by corona treatment or flame treatment. In a particularly preferred embodiment of this surface treatment step the surface that is subsequently coated is corona treated.

In a preferred embodiment of the subsequent step, the step of coating the surface, that step is provided by gravure coating. The gravure coating step, in this preferred embodiment, is conducted by utilizing a gravure coater. Other coating methods known in the art, for example, spray coating, may be substituted for the preferred use of gravure coating.

After completion of the coating operation, the film is preferably subjected to heating to accelerate drying of the coating which, as is discussed below, is applied as a solution composition. Drying involves exposure of the film to elevated temperature. Depending upon the temperature employed in drying the coated monoaxially oriented film, the film may or may not be cooled or heated to obtain optimum temperature conditions during the next step, transverse orientation.

In the final essential step, the longitudinally oriented, coated film is oriented in the transverse direction. Preferably, orientation in the transverse direction is accomplished by transverse stretching. In the preferred embodiment wherein stretching is utilized to orient the film in the transverse direction, the film is stretched from about 6 to about 10 times its original width. More preferably, the longitudinally oriented films is stretched from about 7 to about 9 times its prestretched width.

In a preferred embodiment of this process, the film is annealed following transverse direction orientation. Annealing of the biaxially oriented film involves exposure of the film to elevated temperature. As in all heating steps, preferred temperatures are a function of the identity and constituency of the polypropylene-containing thermoplastic resin constituting the film.

In yet a further step included in a preferred embodiment of this invention the uncoated surface of the biaxially oriented coated film is treated to improve its wettability and adhesion. Such treatment permits printing thereupon or the application of an adhesive followed by the application of another film ply to produce a laminate structure. In a preferred embodiment this surface treatment step is provided by corona treatment.

The coating layer, as stated above, is applied to the longitudinally oriented film. In a preferred embodiment, an alkali metal salt of an alkyl sulfate, the identity of which is discussed above, is applied as a solution composition. Preferably, the solution is an aqueous solution. The use of water as the solvent minimizes cost while, at the same time, optimizing safety and minimizing environmental concerns. Those skilled in the art are aware that organic solvents create the possibility of explosion, fire and environmental problems. These concerns are eliminated by the use of water as the solvent. It is for this reason that an alkali metal salt of an alkyl sulfate is utilized. Those skilled in the art are aware that an alkali metal salt is soluble in water whereas an alkyl sulfate itself is not.

In a preferred embodiment, wherein an aqueous solution of an alkali metal salt of an alkyl sulfate is utilized, the concentration of the alkali metal salt of the alkyl sulfate in the solution is in the range of between about 0.10% by weight and about 10% by weight. More preferably, the concentration of the sulfate solute in the aqueous solution is in the range of between about 0.20% by weight and about 5% by weight. Still more preferably, the concentration of the alkali metal salt of an alkyl sulfate is in the range of between about 0.50% by weight and about 2% by weight. In all of these recitations, the percent by weight of the solute is based on the total weight of the solution.

The following examples are given to illustrate the scope of the present invention. Because these examples are given for illustrative purposes only, the invention should not be limited thereto.

EXAMPLE 1

Preparation of a Coated Biaxially Oriented Polypropylene Film

Polypropylene resin (Exxon [trademark] 4252) was heated to 250° C. whereupon the resin melted. The polypropylene melt was extruded through a slit die of a pilot scale film orienter. The extrudate was cast upon a cooling drum maintained at 30° C. The polypropylene melt was quenched on the drum to product a sheet 30 mils thick. The sheet was reheated to 140° C. and then stretched five times its original length in the longitudinal direction. This resulted in a decrease in thickness to about 6 mils. The longitudinally stretched film was then corona treated followed by coating of the corona treated surface with a 3% by weight aqueous solution of sodium lauryl sulfate. The coated film was dried at 160°. C. The dry coated film was then cooled to 145° C. and stretched in a transverse direction. The width of the film was increased to eight times its original width. The thus formed biaxially stretched film was annealed at 160° C. The annealed film, now 0.8 mil thick, was again corona treated. This corona treatment was conducted on the film's uncoated surface.

The resulting coated film was determined to have a haze of 2%, as measured by ASTM Test Procedure D-1003; a gloss of 84.4, as measured by ASTM Test Procedure D-2457; a coefficient of friction of 0.12, as measured by ASTM Test Procedure D-1894; and a blocking force of 0.4 g/in.

EXAMPLE 2

Preparation of a Coated Biaxially Oriented Polypropylene Film

A coated polypropylene film was formed in accordance with the procedure of Example 1. The only distinction between this example and Example 1 was that the concentration of the aqueous solution of sodium lauryl sulfate, coated onto the longitudinally stretched film, was 1% by weight, rather than the 3% by weight utilized in Example 1.

The resultant film had a percent haze of 1.4%, a gloss of 92.5%, a coefficient of friction 0.19 and a blocking force of 0.8 g/in. These physical properties were determined in accordance with the test prodedures set forth in Example 1.

This example establishes that decreased concentration of sodium lauryl sulfate somewhat decreases the anti-blocking characteristics of the film while marginally improving its optical properties.

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the subject invention should be limited only by the appended claims.

We claim:

1. A biaxially oriented polypropylene film comprising a longitudinally oriented film comprising polypropylene stretched from about 3 to about 7 times its original length and
a coating layer of an alkali metal salt of an alkyl sulfate wherein alkyl of the alkyl sulfate contains between about 4 to about 24 carbon atoms,
wherein said coating layer is provided on a surface of said longitudinally oriented film, prior to transverse orientation of the film, and
where said coating layer is effective to reduce the coefficient of friction of said surface in the biaxially oriented film, wherein the film, after transverse orientation, is free of optical flaw.

2. The film in accordance with claim 1 wherein said polypropylene is selected from the group consisting of a polypropylene homopolymer, a blend of a polypropylene homopolymer and another olefinic polymer, a co-extrusion of a polypropylene homopolymer and another olefinic polymer and mixtures thereof.

3. A film in accordance with claim 2 wherein said polypropylene is selected from the group consisting of a polypropylene homopolymer and a co-extrusion of a polypropylene homopolymer and another olefinic polymer.

4. A film in accordance with claim 3 wherein said polypropylene is selected from the group consisting of a polypropylene homopolymer and a co-extrusion of a polypropylene homopolymer and an ethylene-propylene copolymer.

5. A film in accordance with claim 4 wherein said polypropylene is a polypropylene homopolymer.

6. A film in accordance with claim 1 wherein said coating layer is selected from the group consisting of a sodium salt of an alkyl sulfate and a potassium salt of an alkyl sulfate.

7. A film in accordance with claim 6 wherein said coating layer is a sodium salt of an alkyl sulfate.

8. A film in accordance with claim 1 wherein said coating layer is an alkali metal salt of an alkyl sulfate where said alkyl group of said alkyl sulfate contains about 4 to about 24 carbon atoms.

9. A film in accordance with claim 8 wherein said alkyl contains between about 6 and about 18 carbon atoms.

10. A film in accordance with claim 9 wherein said alkyl contains between about 8 and 16 carbon atoms.

11. A film in accordance with claim 10 wherein said alkyl contains about 10 and about 14 carbon atoms.

12. A film in accordance with claim 1 wherein said polypropylene is a polypropylene homopolymer and said coating layer is sodium lauryl sulfate.

13. The film of claim 1, wherein the optical flaw is measured by a test method selected from the group consisting of ASTM D-1003 to measure haze, and ASTM D-2457 to measure gloss.

14. The film of claim 1, wherein the film has an uncoated surface which is corona treated.

15. The film of claim 1, wherein the film is stretched from about 6 to about 10 times its original width in transverse orientation.

16. A biaxially oriented polypropylene film comprising
a longitudinally oriented film comprising polypropylene coextruded with ethylene polypropylene copolymer; and
a coating layer of an alkali metal salt of an alkyl sulfate wherein alkyl of the alkyl sulfate contains between about 4 to about 24 carbon atoms,
wherein said coating layer is provided on a surface of said longitudinally oriented film, prior to transverse orientation of the film, and
where said coating layer is effective to reduce the coefficient of friction of said surface in the biaxially oriented film, wherein the film, after transverse orientation is free of optical flaws.

17. The film of claim 16, wherein the longitudinally oriented film is stretched from about 3 to about 7 times its original length.

18. The film of claim 17, wherein the film has an uncoated surface which is corona treated.

19. The film of claim 17, wherein the film is stretched from about 6 to about 10 times its original width in transverse orientation.

20. The film of claim 19, wherein the optical flaw is measured by a test method selected from the group consisting of ASTM D-1003 to measure haze, ASTM D-2457 to measure gloss.

21. The film of claim 16, wherein the film is stretched from about 6 to about 10 times its original width in transverse orientation.

22. The film of claim 16, wherein the optical flaw is measured by a test method selected from the group consisting of ASTM D-1003 to measure haze, ASTM D-2457 to measure gloss.

* * * * *